United States Patent
Johnson, Jr.

(10) Patent No.: US 8,060,967 B1
(45) Date of Patent: Nov. 22, 2011

(54) ROTARY HAIR BRUSH WITH DEBRIS REMOVER

(76) Inventor: Robert Earl Johnson, Jr., Northville, MI (US)

(*) Notice: Subject to any disclaimer, the term of this patent is extended or adjusted under 35 U.S.C. 154(b) by 943 days.

(21) Appl. No.: 11/983,846

(22) Filed: Nov. 13, 2007

Related U.S. Application Data

(60) Provisional application No. 60/857,915, filed on Nov. 10, 2006.

(51) Int. Cl.
*A01K 13/00* (2006.01)

(52) U.S. Cl. ............... 15/23; 15/22.3; 15/88.3; 119/615; 119/628

(58) Field of Classification Search ............ 15/23, 38, 15/39; 901/1; *A47L 5/00*
See application file for complete search history.

(56) References Cited

U.S. PATENT DOCUMENTS

| | | | | |
|---|---|---|---|---|
| 2,960,714 A | * | 11/1960 | Senne | 15/349 |
| 3,427,674 A | * | 2/1969 | Simon, Jr. et al. | 15/23 |
| 3,431,571 A | * | 3/1969 | Kraus | 15/23 |
| 3,646,629 A | * | 3/1972 | Bienek | 15/48 |
| 3,747,152 A | * | 7/1973 | Tsuruzawa | 15/22.4 |
| 3,805,318 A | * | 4/1974 | Marquette | 15/311 |
| 3,893,425 A | | 7/1975 | Lapres | |
| 4,083,327 A | | 4/1978 | Dowdy | |
| 4,664,132 A | | 5/1987 | Schillig | |
| 5,275,183 A | | 1/1994 | Landry | |
| 5,584,088 A | | 12/1996 | Pauldine | |
| 6,098,635 A | * | 8/2000 | Marino | 132/238 |
| 6,158,073 A | | 12/2000 | Jiovanni | |
| 6,739,016 B2 | | 5/2004 | Bigio | |
| 2004/0231077 A1 | | 11/2004 | Richmond | |

* cited by examiner

*Primary Examiner* — Monica Carter
*Assistant Examiner* — Stephanie Newton
(74) *Attorney, Agent, or Firm* — Carrier Blackman & Associates, P.C.; William D. Blackman; Joseph P. Carrier

(57) ABSTRACT

A rotating hair brush with a fins or similar implement projected into the moving path of the brush bristles. The fins automatically remove the hair/fur from the brush bristles. The amount of exposed bristles can be varied and completely concealed inside of the housing. The brush core can contain the batteries and/or motor to reduce the overall size of the assembly. A suction device can be attached to remove dislodged debris. The overall structure contains all of the components such as the motor, power source, brush and hair removal fins in a single housing. The brush is removable and can be exchanged for another with a different bristle configuration.

15 Claims, 5 Drawing Sheets

ROTARY HAIR BRUSH WITH DEBRIS REMOVER

CROSS-REFERENCED TO RELATED APPLICATIONS

This application claims the benefits of provisional patent application Ser. No. 60/857,915, filed Nov. 10, 2006. The entire disclosure of the referenced application is incorporated by reference herein.

FEDERALLY SPONSORED RESEARCH

Not Applicable

SEQUENCE LISTING

Not Applicable

BACKGROUND OF THE INVENTION

1. Field of the Invention

This invention relates to brushes used on human hair, animal hair and animal fur. Brushing short curly human hair is a simple process if you don't desire a well-manicured look.

2. Discussion of Background Art

To achieve a well-manicured look or wave pattern, the hair must be trained over time by employing a regimen of manual brushing multiple times a day a few minutes at a time. A similar problem occurs with animal hair and animal fur. There are many styles of pet brushes on the market, but each requires the user to spend large amounts of time brushing the coat of the animal to achieve the desired results, in addition to removing the animal hair/fur from the brush.

Research did not uncover any products specifically designed to address all of the problems for short human hair, animal hair or animal fur, but there are a few patents that attempt to provide solutions.

U.S. Pat. No. 6,098,635 issued to Marino (2000) and U.S. Pat. No. 6,158,073 issued to Jiovanni (2000), provide a means for brushing long human hair. Both inventions utilize a brush with bristles spaced 360 degrees around a core powered by a motor and the Marino invention includes dividers that prevent the hair from wrapping around the brush core. The Jiovanni invention can be used on short or long human hair but the separate handle-brush configuration isn't effective at applying downward force through the bristles to the scalp. The handle-brush configuration requires the user to generate a large amount of force across a moment arm to generate the desired downward force at the scalp.

The Marino invention is intended to be used by humans with long hair who are concerned about their hair wrapping around the brush core. The dividers in this configuration make it difficult to use close to the scalp and skin because the dividers will bump against the surface. Also neither of these inventions provides a means of removing the hair and fur that may get lodged into the bristles.

U.S. Pat. App. No. 2004/0231077 submitted by Richmond provides a means for brushing short hair close to the scalp or skin. This invention utilizes a belt with perpendicular bristles to smooth the hair. Just as the other inventions, the Richmond solution does not provide a means of removing hair or fur from the bristles.

Although the prior devices have utility for their intended purposes, there remains a need in the art for a hair/fur brush that overcomes all of the known deficiencies and problems. The present invention has been developed as a solution to the known problems, and specifically to provide a hair brush that delivers many strokes per minute with minimal manual effort and the ability to easily remove dislodged hair and fur from the brush bristles, and more specifically such a brush having a configuration that can easily apply sufficient downward force between the bristles and the object being brushed to achieve maximum performance.

SUMMARY OF INVENTION

Objects and advantages of the invention include provision of a brush, which can:

a) provide more brush strokes per minute compared to manually brushing;

b) provide direct vertical force against the brush assembly to provide the proper force between the brush bristles and the object being brushed;

c) automatically remove hair and fur from the brush bristles;

d) adjust the amount of the brush bristles that come in contact with the object being brushed;

e) conceal the bristles in housing to improve portability;

f) extract debris from the housing via a suction device attached to the vacuum port;

g) conceal the power source (batteries and/or motor) inside of the brush core to reduce to total size of the assembly; and/or h) allow a user to remove and replace the brush member for one that is more appropriate for the application.

To achieve the above objects, and according to one aspect of the present invention, there is provided a motorized hair brush, comprising a brush with bristles that may be spaced 360 degrees around a core enclosed in a housing shared with power source that rotates a brush assembly. Enclosing the brush member in the housing may allow the housing to be used as a handle for the brush assembly effectively translating the proper force through the housing, to the brush member and to the object being brushed. The housing is configured to be holdable in a hand of a user and moved over the user's scalp.

The motorized hair brush could include a mechanism that selectively varies the brush rotation speed, changes the direction of rotation and locks the brush assembly in place to improve usability. This combination of components is an effective method of delivering 0 to 500 brush strokes per minute compared to manually brushing with a hair brush, consisting of four rows of bristles, which may deliver up to 120 brush strokes per minute.

To improve the performance of the invention, according to an exemplary embodiment thereof, the motorized hair brush may include a mechanism for varying the amount of bristles exposed from the housing. Varying the depth of penetration of the brush bristles beyond the hair surface affects how the hair will lay after being brushed and it influences the amount of friction that must be overcome by a power source.

To further improve the performance of the invention, a mechanism whereby a brush member may be removed and exchanged with other, different brush members could be included. Additional brush members may be constructed with different bristle material, bristle configurations and bristle length.

An additional mechanism that may be used to achieve the objectives of the invention are appendages that project into the path of the rotating brush bristles to automatically remove hair or fur that becomes lodged in the brush bristles during use. The appendages or fins may be constructed of a rigid material like plastic or steel and with sufficient thickness to resist deflecting when impacted by the brush bristles. Further, a vacuum port could be integrated into a housing to remove additional debris dislodged during the brushing process.

To reduce the overall size of the assembly and to make it more portable, a power source and/or power supply may be installed inside a brush core. To further improve portability a brush member may be concealed inside of a housing behind access doors making it easier to store the invention in a pocket or bag.

DETAILED DESCRIPTION

Figure 1:
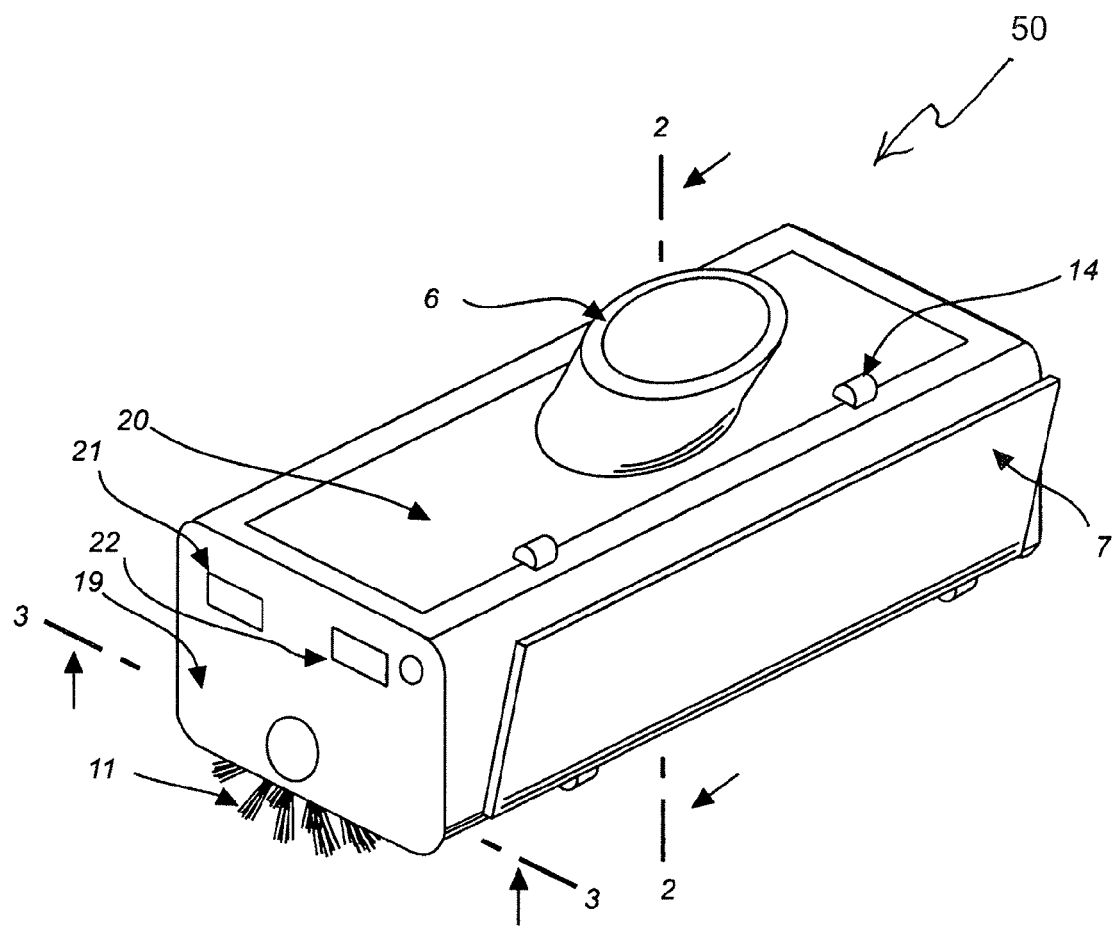
FIG. 1 is a perspective view of the rotary hair brush with debris removal of the present invention.

FIG. 1 is a perspective view of a rotary hair brush (50) according to an illustrative embodiment of the present invention. The hair brush (50) is provided with debris removal features. A housing (19) of the hair brush (50) according to the present invention contains additional components of the assembly. The housing (19) includes a hollow housing body having a first opening (24) formed in a lower surface thereof, which may be selectively covered by lower access doors (7, 18). Brush bristles (11) may be exposed through the lower opening (24) when the right lower access door (7) is in the open position. The top of the housing (19) may have an upper access door (20) that rotates about an access door hinge (14). A vacuum port (6) is attached to the upper access door (20) to allow debris to be extracted when a suction device such as a vacuum is attached to the vacuum port (6).

A power and speed switch (21) may be located on the side of the housing (19) and could vary the rotational speed of the brush member. A lock switch (22) may also be located on the side of the housing and used to prevent the brush member from rotating.

Figure 2:
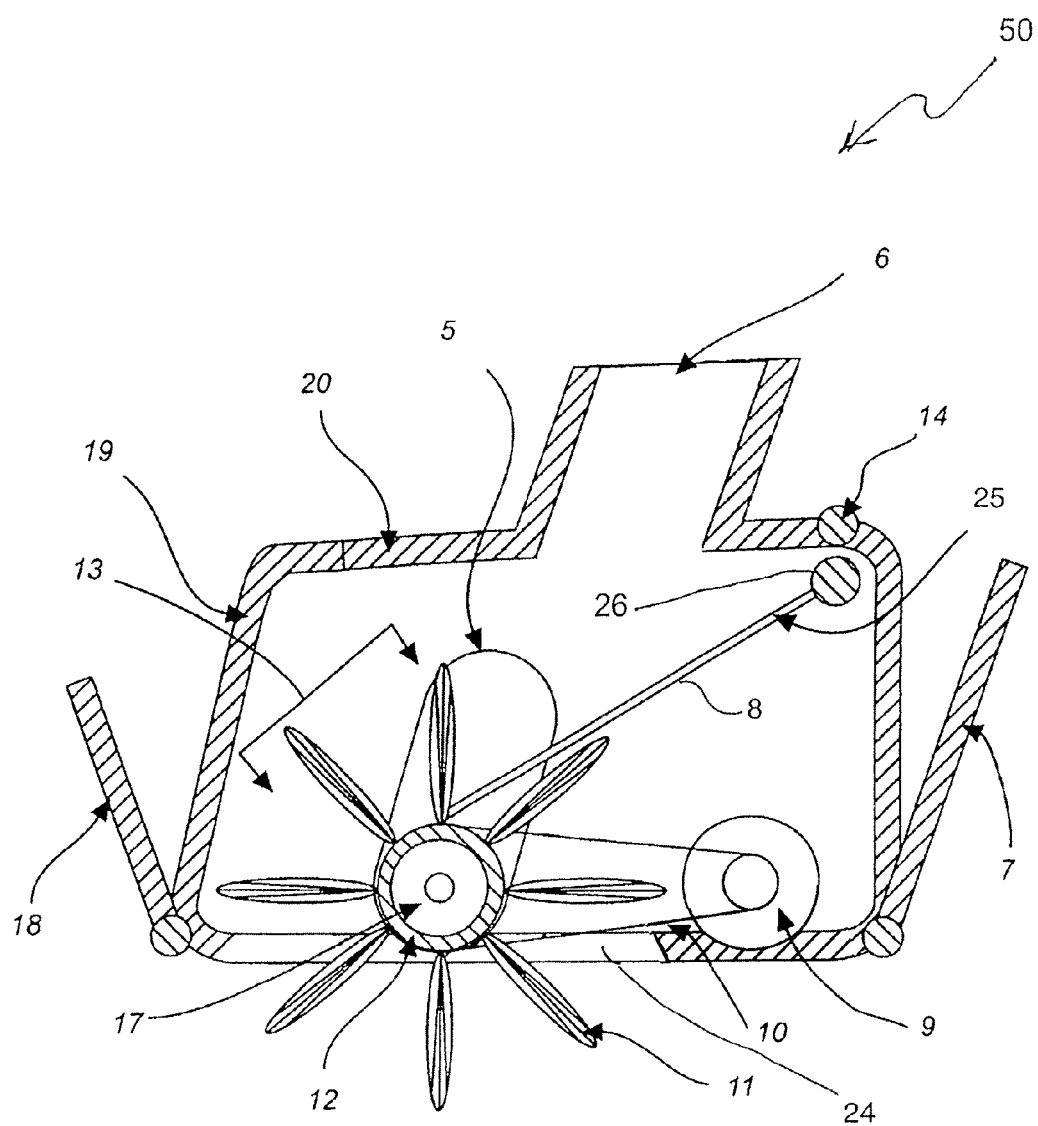
FIG. 2 is a side sectional view of an exemplary embodiment of a rotary hair brush according to the present invention taken through plane 2-2 of FIG. 1.

FIG. 2 represents a side view, shown partially in cross section, of an exemplary embodiment of a rotary hair brush (50) with debris removal assembly according to an illustrative embodiment of the present invention. The side view is taken through the plane 2-2 in FIG. 1. Brush bristles (11) are attached to a brush core (12), and combined they create a brush member (13). The brush member (13) sits in a retractable brush channel (5) in a manner which allows the brush member (13) to be removed and replaced, adjusted to the desired height or be totally retracted and concealed in the housing (19) by closing the left and right lower access doors (18), (7).

A power source may include batteries (17) located inside of a brush core (12) to save space and provide power to a motor (9) that rotates a brush member (13) via a drive belt (10) or similar power transmitting device.

Figure 5:
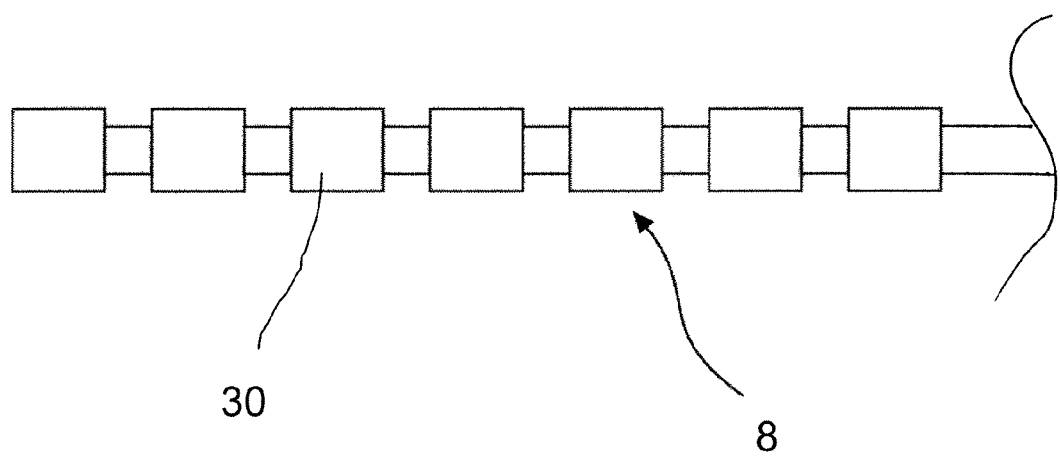
FIG. 5 is a detail plan view of a portion of a ribbed appendage of a comb member which is a component of the rotary brush of FIG. 1.

The hair brush (50) also includes a comb member (25) which is disposed in and pivotally attached to the housing (19), the comb member including a spine (26) and a plurality of fins or appendages (8) having first ends that are attached to the spine, and second ends which extend into the groups of brush bristles (11). Optionally, as shown in FIG. 5, the appendages (8) may include ribs (30) formed thereon, in order to provide texture and to retain hair and other debris after such hair or debris has been extracted from the bristles of the brush member.

The housing (19) has an upper access door (20) that can be pivoted about an access door hinge (14) to allow access to the comb member (25) with the hair/fur removal fins (8) that extract debris from the brush bristles (11). A vacuum port (6) may also be attached to the top of an upper access door (20) to facilitate removal of debris that accumulated in the brush member (13) during use.

Figure 3:
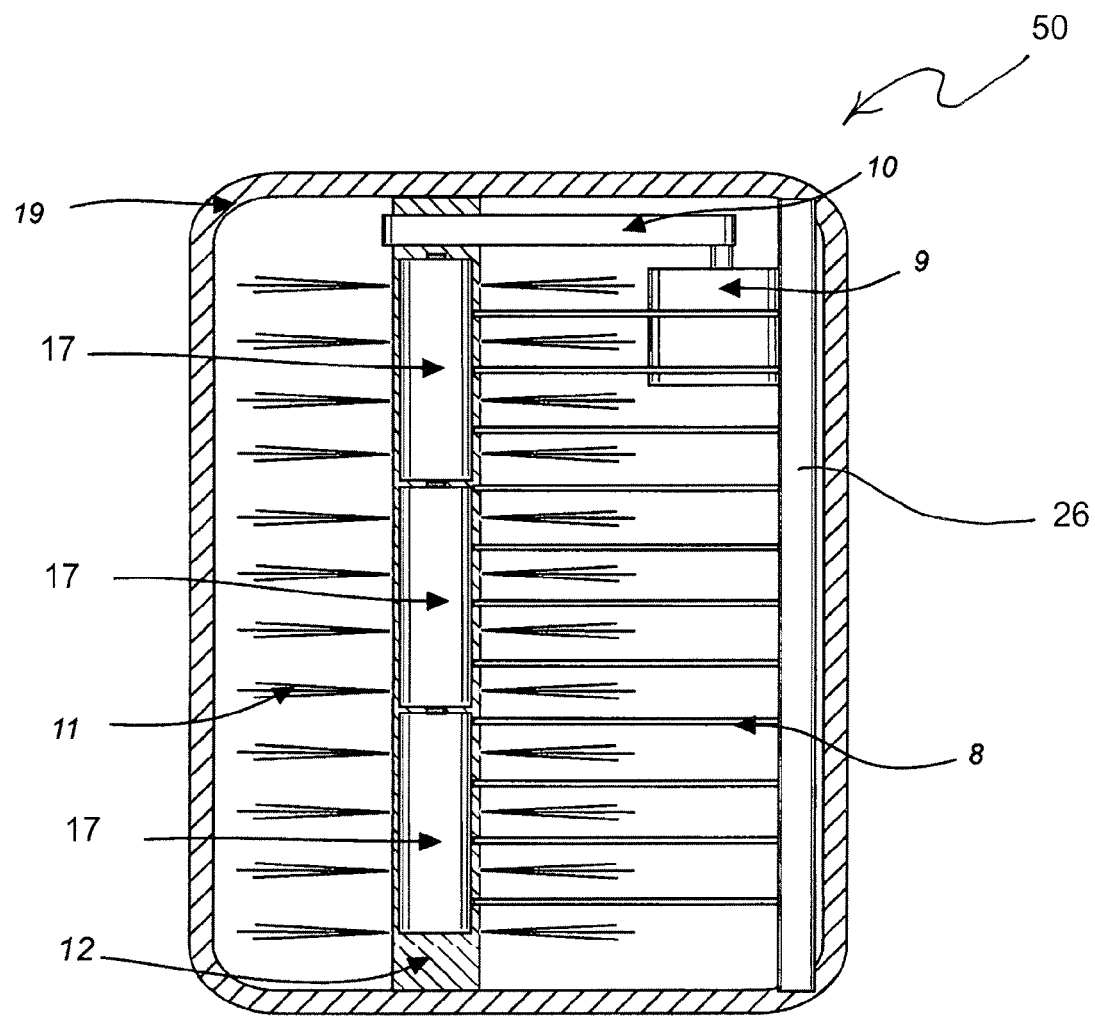
FIG. 3 is a sectional bottom view of an exemplary embodiment of a rotary hair brush according to the present invention taken through plane 3-3 of FIG. 1.

FIG. 3 represents a bottom view, shown partially in cross section, of a rotary hair brush (50) with debris removal of FIG. 1 taken through plane 3-3. It illustrates a location of the hair removal fins (8) in relationship to the brush bristles (11). This view also provides a view of the batteries (17) located inside of the brush core (12). The batteries (17) are disposed in a hollow battery-receiving area, either in the housing (19) or the brush core (12).

Figure 4:
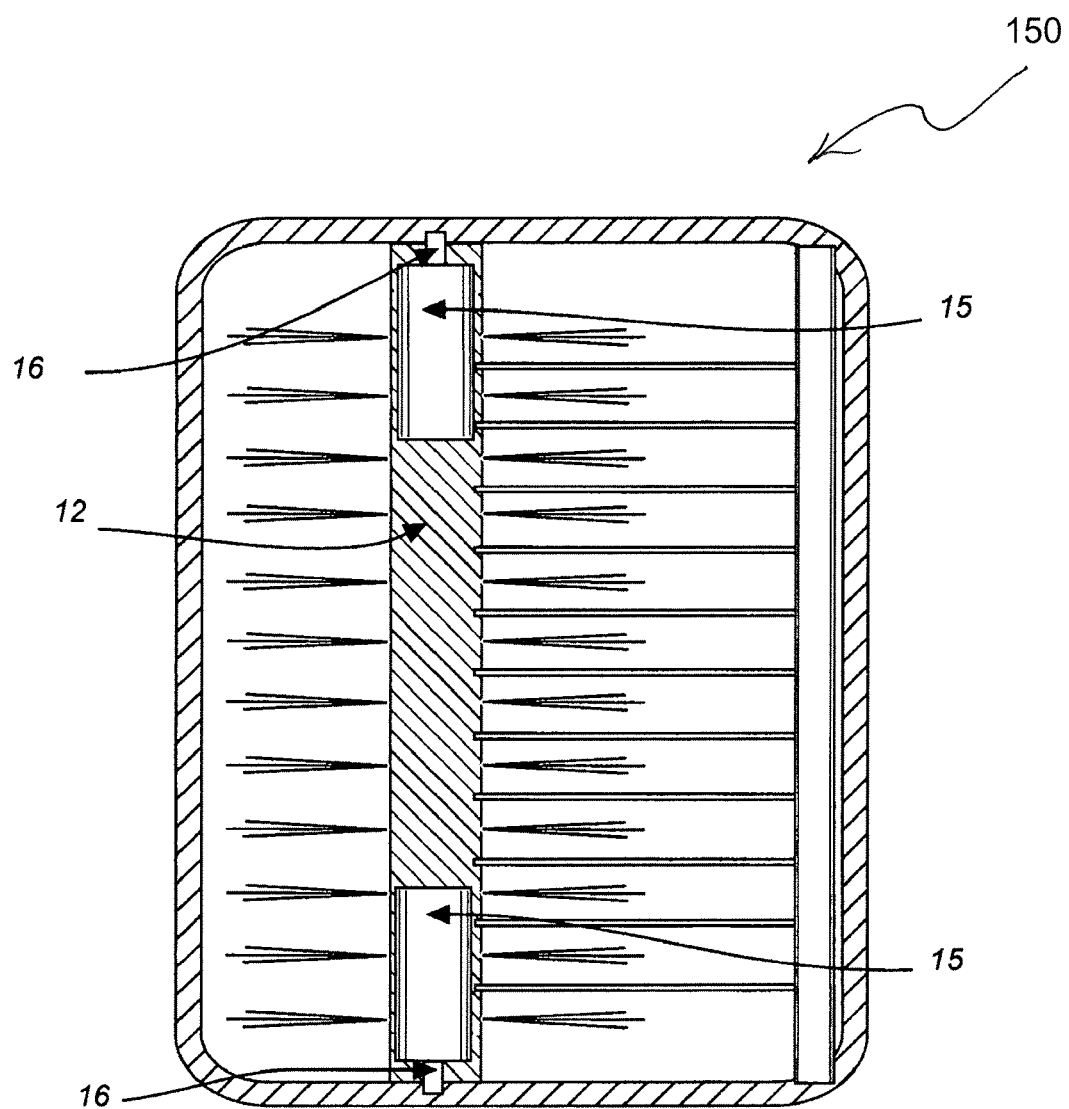
FIG. 4 is a sectional bottom view of an alternative embodiment of a rotary hair brush according to the present invention taken through plane 3-3 of FIG. 1, illustrating an alternate location of the motor.

FIG. 4 represents an alternative embodiment of a rotary hair brush (150) with debris removal according to the present invention wherein the motor (15) is housed inside a brush core (12) and is attached to a housing by the motor shaft (16).

Operation

In operation, the rotary hair brush with debris removal (FIGS. 1, 2, 3 and 4) may be used in substantially the same manner as a human hair or pet brush. The bristles (11) are exposed and adjusted to the desired height. The motor (9) or internal motors (15) are activated using an adjustable speed power switch, set to the desired speed and then the brush assembly is moved across a surface to be brushed in the desired direction. Hair lodged in the bristles (11) is automatically removed by the hair/fur removal fins (8) and the fins may be cleaned by opening the upper access door (20) and rotating the fin assembly (8) out of the path of the bristles so the hair/fur can be extracted from the fins. A suction device can be installed to the vacuum port (6) to aid remove of additional debris.

If the user desires, the brush member (13) can be retracted inside of the housing along the retractable brush channel (5) and the left and right lower access doors (18) (7) closed to provide better portability.

Although the description above contains many structural details regarding the disclosed embodiments, these should not be construed as limiting the scope of the invention but merely providing an illustration of some exemplary embodiments of this invention.

I claim:

1. A brush assembly comprising:
   a. a brush member including a core and groups of bristles radially projecting from the core;
   b. a housing in which the core is rotatably disposed, the housing configured to allow the bristles to protrude outwardly therefrom, the housing configured and dimensioned to be holdable in a hand of a user, and the brush assembly usable to brush hair or fur;
   c. a drive mechanism provided within the housing and which is operable to rotate the brush member; and
   d. a comb member which is disposed in and pivotally attached to the housing, the comb member comprising a spine and a plurality of appendages having first ends that are attached to the spine and second ends which extend into the groups of brush bristles such that when either the appendages or the group of bristles traverse toward the other while the brush member is being rotated, said appendages are operable to extract hair and other debris that has become lodged in or between the groups of brush bristles.

2. The brush assembly of claim 1 wherein the bristles are arranged in rows distributed around the circumference of the core.

3. The brush assembly of claim 1 wherein the bristles are arranged in rows extending parallel to the longitudinal axis of the core.

4. The brush assembly of claim 1 wherein the appendages are made of a material with sufficient rigidity to deflect the bristles when contacted thereby.

5. The brush assembly of claim 1 wherein the appendages are elongated with a circular cross section.

6. The brush assembly of claim 1 wherein surfaces of the appendages are ribbed.

7. The brush assembly of claim 1 wherein the appendages are removable from between the bristles to facilitate cleaning debris from the appendages.

8. The brush assembly of claim 2, wherein the appendages are arranged such that at least one appendage extends between each pair of adjacent rows of bristles.

9. A brush assembly comprising:
a brush member including a core and groups of bristles radially projecting from the core;
a housing in which the core is rotatably disposed;
a drive mechanism provided in the housing which is operable to rotate the brush member; and
a plurality of appendages that extend into the groups of brush bristles such that when either the appendages or the group of bristles traverse toward the other while the brush member is being rotated, wherein said appendages are configured and arranged to extract hair and other debris that becomes lodged in the groups of brush bristles;
and wherein the brush member is disposed rotatably in a channel inside of the housing allowing said brush member to be adjustably retracted inside the housing exposing 0 to 100% of the length of bristles attached to the brush member.

10. The brush assembly of claim 1 wherein the housing has a cylindrical protrusion extending from a surface of the housing to receive a hose from a suction device.

11. A rotatable brush assembly comprising:
a hollow housing configured to allow bristles of a brush member to selectively protrude outwardly therefrom exposing 0 to 100% of the length of bristles attached to the brush member, the housing configured and dimensioned to be holdable in a hand of a user, and the brush assembly usable to brush hair or fur;
a motor; and
the brush member which is rotatably disposed in the housing, the brush member comprising a core and groups of bristles radially projecting from the core, the core having the motor disposed in the interior thereof which is operable to rotate the brush member;
wherein the brush assembly has a battery-receiving area formed therein for supportively receiving at least one battery in the housing or the brush member.

12. The rotatable brush assembly of claim 11, wherein the motor is securely affixed to a portion of the core, is disposed inside the core and has a shaft extending axially thereon at a distal end of said motor.

13. The rotatable brush assembly of claim 12, wherein the shaft is attached to the housing.

14. The brush assembly of claim 1, wherein the brush assembly has a battery-receiving area formed therein for supportively receiving at least one battery in the housing or the brush member.

15. The brush assembly of claim 1, wherein the housing comprises a housing body and an upper access door pivotally attached to an upper surface of the housing body to provide access to the comb member.

* * * * *